(12) United States Patent
Mazumdar

(10) Patent No.: US 9,453,171 B2
(45) Date of Patent: Sep. 27, 2016

(54) INTEGRATED STEAM GASIFICATION AND ENTRAINED FLOW GASIFICATION SYSTEMS AND METHODS FOR LOW RANK FUELS

(71) Applicant: General Electric Company, Schenectady, NY (US)

(72) Inventor: Anindra Mazumdar, Katy, TX (US)

(73) Assignee: General Electric Company, Schenectady, NY (US)

( * ) Notice: Subject to any disclaimer, the term of this patent is extended or adjusted under 35 U.S.C. 154(b) by 729 days.

(21) Appl. No.: 13/788,655

(22) Filed: Mar. 7, 2013

(65) Prior Publication Data

US 2014/0250858 A1 Sep. 11, 2014

(51) Int. Cl.
*C10J 3/00* (2006.01)
*F02C 3/28* (2006.01)
*C10L 5/04* (2006.01)
(Continued)

(52) U.S. Cl.
CPC ...... *C10J 3/721* (2013.01); *C10L 5/04* (2013.01); *C10L 9/083* (2013.01); *F02C 3/28* (2013.01); *C10J 3/466* (2013.01); *C10J 2300/0906* (2013.01); *C10J 2300/0909* (2013.01); *C10J 2300/0959* (2013.01); *C10J 2300/0976* (2013.01); *C10J 2300/165* (2013.01); *C10J 2300/1653* (2013.01); *C10J 2300/1662* (2013.01); *C10J 2300/1678* (2013.01); *C10J 2300/1823* (2013.01); *C10J 2300/1853* (2013.01); *C10L 5/44* (2013.01); *Y02E 20/16* (2013.01); *Y02E 20/18* (2013.01); *Y02E 50/10* (2013.01); *Y02E 50/15* (2013.01); *Y02E 50/30* (2013.01); *Y02P 20/13* (2015.11)

(58) Field of Classification Search
CPC ............ C10J 3/00; C10J 3/721; C10J 3/466; C10J 2300/0906; C10J 2300/0909; C10J 2300/0959; C10J 2300/165; C10J 2300/1823
See application file for complete search history.

(56) References Cited

U.S. PATENT DOCUMENTS 2,662,816 A * 12/1953 Kalbach .................... 48/202
3,039,955 A 6/1962 Honnold, Jr.
(Continued)

FOREIGN PATENT DOCUMENTS

EP 0934904 A2 8/1999
WO 2008067221 A1 6/2008

OTHER PUBLICATIONS

Dr.Majed Toqan , "A Novel Concept for Preferential Production of Methane Rich Syngas from CoaL","Small Business innovation ResearchSmall Business Technology Transfer",USA, 2010.

*Primary Examiner* — Matthew Merkling
(74) *Attorney, Agent, or Firm* — Armstrong Teasdale LLP

(57) ABSTRACT

In one aspect, a gasification system for use with low rank fuel is provided. The system includes a first gasifier positioned to receive a feed of low rank fuel, the first gasifier being configured to gasify the low rank fuel to produce hydrocarbons and fixed carbon. The system also includes a second gasifier configured to produce a syngas stream using the received fixed carbon, a cooler configured to receive and cool the syngas stream, and a first conduit coupled between the cooler and the first gasifier. The first conduit is configured to recycle at least a portion of the syngas stream to the first gasifier to facilitate heating low rank fuel within the first gasifier. The recycled syngas stream is mixed with the hydrocarbons to produce a hydrocarbon-rich syngas stream. The system also includes a second conduit coupled to the first gasifier for receiving the hydrocarbon-rich syngas stream.

18 Claims, 2 Drawing Sheets

(51) Int. Cl.
  *C10L 5/44* (2006.01)
  *C10J 3/72* (2006.01)
  *C10L 9/08* (2006.01)
  *C10J 3/46* (2006.01)

(56) References Cited

U.S. PATENT DOCUMENTS

| | | | |
|---|---|---|---|
| 3,844,733 A | 10/1974 | Donath | |
| 3,963,426 A | 6/1976 | Hand | |
| 3,988,123 A | 10/1976 | Coates | |
| 4,013,428 A | 3/1977 | Babbitt | |
| 4,078,973 A | 3/1978 | Choi et al. | |
| 4,497,637 A | 2/1985 | Purdy et al. | |
| 4,571,249 A * | 2/1986 | Bonasso | C10J 3/62 48/63 |
| 5,034,021 A * | 7/1991 | Richardson | 48/77 |
| 5,134,944 A | 8/1992 | Keller et al. | |
| 5,550,312 A | 8/1996 | Schingnitz et al. | |
| 6,033,456 A | 3/2000 | Jahnke | |
| 7,888,540 B2 | 2/2011 | Deluga et al. | |
| 7,955,403 B2 | 6/2011 | Ariyapadi et al. | |
| 8,043,391 B2 | 10/2011 | Dinjus et al. | |
| 8,100,990 B2 | 1/2012 | Ellens et al. | |
| 8,182,771 B2 | 5/2012 | Frydman et al. | |
| 2004/0200393 A1* | 10/2004 | Zauderer | C01B 3/02 110/345 |
| 2006/0112639 A1* | 6/2006 | Nick | C10J 3/08 48/198.1 |
| 2008/0016769 A1* | 1/2008 | Pearson | 48/197 R |
| 2008/0098654 A1 | 5/2008 | Cherry et al. | |
| 2008/0103220 A1 | 5/2008 | Cherry et al. | |
| 2008/0222956 A1 | 9/2008 | Tsangaris et al. | |
| 2009/0031615 A1 | 2/2009 | Joshi et al. | |
| 2009/0107046 A1 | 4/2009 | Leininger et al. | |
| 2009/0173081 A1 | 7/2009 | Wallace | |
| 2010/0170247 A1 | 7/2010 | Bommareddy et al. | |
| 2010/0263383 A1 | 10/2010 | York et al. | |
| 2011/0009501 A1 | 1/2011 | Ernst | |
| 2011/0036014 A1* | 2/2011 | Tsangaris | C01B 3/22 48/62 R |
| 2011/0186489 A1 | 8/2011 | Kain et al. | |
| 2011/0314736 A1 | 12/2011 | Crespin | |
| 2012/0036777 A1 | 2/2012 | Patel | |
| 2012/0039776 A1 | 2/2012 | Ghosh | |
| 2012/0244448 A1 | 9/2012 | Hallum et al. | |
| 2013/0199919 A1* | 8/2013 | Li et al. | 201/7 |
| 2013/0306913 A1* | 11/2013 | Li | C10J 3/20 252/373 |

* cited by examiner

INTEGRATED STEAM GASIFICATION AND ENTRAINED FLOW GASIFICATION SYSTEMS AND METHODS FOR LOW RANK FUELS

BACKGROUND

The field of the invention relates generally to gasification systems, and more particularly, gasification systems for producing synthetic natural gas (SNG) from low rank fuels.

Feedstock, such as coal, petroleum coke, biomass, wood-based materials, agricultural wastes, tars, coke oven gas and asphalt, and other carbon-containing items may be gasified for use in the production of electricity, chemicals, synthetic fuels, and for a variety of other applications. Gasification generally involves reacting a carbonaceous fuel and oxygen at a very high temperature to produce syngas, a fuel containing carbon monoxide and hydrogen. Syngas typically burns more efficiently and cleaner than the fuel in its original state before gasification. The syngas may be used for power generation, chemical production, and any other suitable application.

Some carbon containing solid feedstocks commonly known as low rank feedstocks, however, are unsuitable and/or inefficient for use in connection with some known gasification systems. Low rank feedstocks are typically undesirable due to their low heating value and inherently higher oxygen content as compared to fuels typically used in gasification systems. In addition, low rank fuels typically form a very watery slurry, and typical entrained gasification systems are inefficient in producing syngas with such fuels.

BRIEF DESCRIPTION

In one aspect, a gasification system for use with low rank fuel is provided. The system includes a first gasifier positioned to receive a feed of low rank fuel, the first gasifier being configured to gasify the low rank fuel to produce hydrocarbons and fixed carbon. The system also includes a second gasifier configured to produce a syngas stream using the received fixed carbon, a cooler configured to receive and cool the syngas stream, and a first conduit coupled between the cooler and the first gasifier. The first conduit is configured to recycle at least a portion of the syngas stream to the first gasifier to facilitate heating low rank fuel within the first gasifier. The recycled syngas stream is mixed with the hydrocarbons to produce a hydrocarbon-rich syngas stream. The system also includes a second conduit coupled to the first gasifier for receiving the hydrocarbon-rich syngas stream.

In another aspect, an integrated gasification combined-cycle power generation plant is provided. The plant includes at least one gasification system including a first gasifier configured to receive low rank fuel, the first gasifier further configured to gasify the low rank fuel to produce hydrocarbons and fixed carbon, a second gasifier configured produce a syngas stream using the fixed carbon, and a cooler configured to cool the syngas stream. The at least one gasification system further includes a first conduit coupled between the cooler and the first gasifier, the first conduit configured to recycle at least a portion of the syngas stream to the first gasifier to facilitate heating the low rank fuel within the first gasifier, the recycled syngas stream mixing with the hydrocarbons to produce a hydrocarbon-rich syngas stream, and a second conduit coupled to the first gasifier and configured to receive the hydrocarbon-rich syngas stream. The plant also includes at least one gas turbine engine coupled in flow communication with the cooler to receive at least a portion of the syngas stream.

In yet another aspect, a method of gasifying a low rank fuel is provided. The method includes providing a feed of low rank fuel to a first gasifier, gasifying the feed of low rank fuel to produce hydrocarbons and fixed carbon, and providing the fixed carbon to a second gasifier. The method further includes gasifying the fixed carbon to produce a syngas stream, providing heating to the first gasifier by recycling at least a portion of the syngas stream to the first gasifier, and removing the hydrocarbons and the recycled syngas stream from the first gasifier as a hydrocarbon-rich syngas stream.

DETAILED DESCRIPTION

Figure 1:
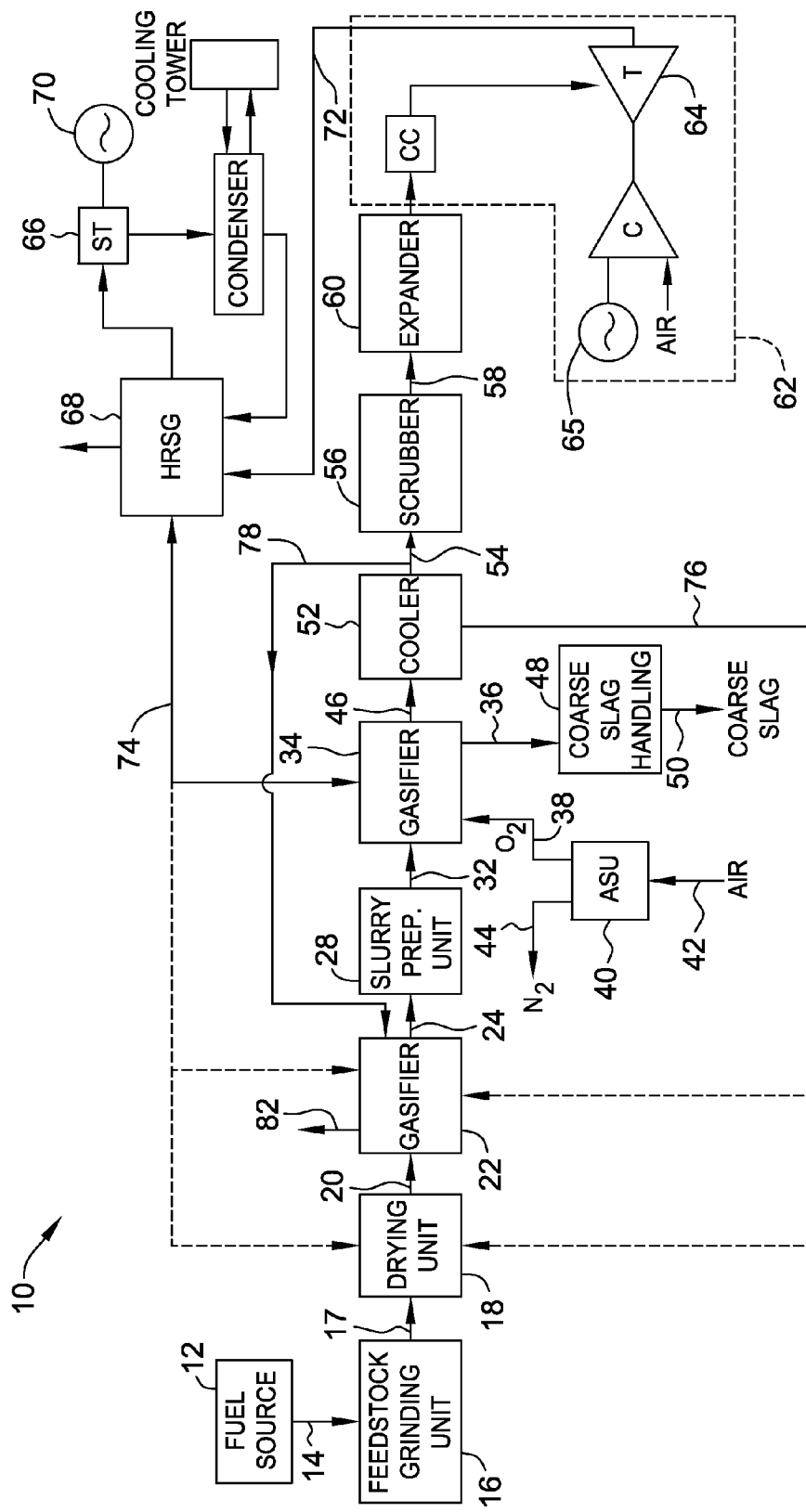
FIG. 1 is a schematic view of an exemplary power generation system.

FIG. 1 is a schematic diagram of an exemplary gasification facility 10, for example, an integrated gasification combined-cycle (IGCC) power generation system, which produces and/or burns synthetic gas, i.e. syngas, to generate electricity and/or to make chemicals. System 10 includes a fuel source 12 that is a low rank fuel. Fuel source 12 may include low rank coal, petroleum, coke, biomass, wood-based materials, agricultural wastes, tars, coke oven gas and asphalt, and/or other carbon containing feedstocks. As used herein, coals having a "low rank" typically have a lower grade than bituminous coal (e.g., sub-bituminous or lignitic coal). In some cases, low rank coals may have a relatively high oxygen content, such as from about 16% to 25% by weight. Low rank coals may have other characteristics including a relatively high moisture content, such as in the range of about 10% to 40%, and a relatively high dry ash content, such as in the range of about 12% to 40%. Low rank coals are present in abundance in the mid-continent region of the United States (as Powder River Basin coal) and in China (as brown coal). However, low rank feedstocks may be inefficient for use in some known gasifiers (e.g., entrained flow gasifiers) because of the low heating value and high water content intrinsic to such coal.

In the exemplary embodiment, a feedstock 14 (e.g., a low rank coal) is conveyed to a feedstock grinding unit 16 that resizes or reshapes feedstock 14 by chopping, milling, shredding, pulverizing, briquetting, and/or palletizing feedstock 14 to generate a gasification fuel 17. Feedstock 17 is then conveyed to a drying unit 18 wherein the coal is exposed to a high temperature that facilitates removing moisture from the coal. Drying unit 18 produces a dried feedstock 20 that is conveyed to a gasifier 22.

In the exemplary embodiment, gasifier 22 is a steam gasifier that uses a pyrolysis process to gasify dried feedstock 20. Alternatively, gasifier 22 may be any type of gasifier that enables system 10 to function as described herein. Temperatures inside gasifier 22 may range from approximately 150° C. to about 800° C., depending on the type of gasifier used. Heating the dried feedstock 20 during the pyrolysis process substantially removes the moisture and volatiles in the low rank fuel and may generate a solid 24 (e.g., a char, a fixed carbon) and hydrocarbons 26 (e.g., methane). The fixed carbon from the pyrolysis process may weigh up to approximately 20% to 40% of the weight of the original feedstock. In the exemplary embodiment, oxygen is not added to gasifier 22 in order to remove volatile hydrocarbons and produce a methane rich product 82.

In the exemplary embodiment, the fixed carbon 24 is channeled to a slurry preparation unit 28 wherein water 30, or another suitable liquid, may be added to fixed carbon 24 to create slurry feedstock 32. Alternatively, no liquid is added to fixed carbon 24, thus yielding dry feedstock. Slurry feedstock 32 is routed to a gasifier 34 from slurry preparation unit 28. In the exemplary embodiment, gasifier 34 is an entrained flow gasifier. Alternatively, gasifier 34 may be any type of gasifier that enables system 10 to function as described herein. Gasifier 34 converts slurry feedstock 32 into a syngas, e.g., a combination of carbon monoxide and hydrogen. This conversion may be accomplished by subjecting the fuel to a controlled amount of a suitable moderator and limited oxygen at an elevated pressure (e.g., between approximately 20 bar and 90 bar) and at an elevated temperature (e.g., between approximately 700° C. and 1600° C.), depending on the type of fuel used. The heating of fuel during a pyrolysis process may generate a slag 36 (e.g., a wet ash material) and residual gases (e.g., carbon monoxide, hydrogen, and nitrogen). Slag 36 may be removed from gasifier 34 and disposed of, for example, as road base or as another building material.

In the exemplary embodiment, a partial oxidation process (i.e., gasification) may then occur in gasifier 34. To facilitate the gasification process, an oxygen stream 38 is supplied to gasifier 34 from an air separation unit (ASU) 40. ASU 40 separates air 42 into component gases via, for example, distillation techniques. ASU 40 separates oxygen 38 and nitrogen 44 from air 42 and transfers the separated oxygen 38 to gasifier 34. ASU 40 may also transfer the separated nitrogen 44 to another portion of system 10 or to storage and/or another facility.

In the exemplary embodiment, a resultant syngas stream 46 and slag 36 are produced by gasifier 34. Slag 36 is conveyed to a coarse slag handling system 48 that produces coarse slag 50 to be sold as product, and syngas stream 46 is conveyed to a cooler 52 for cooling and heat transfer. In the exemplary embodiment, cooler 52 may be a standalone unit or cooler 52 may be formed integral with gasifier 34. A first portion 54 of syngas stream 46 is conveyed to a scrubber 56 for removing certain particulate matter and other pollutants. In the exemplary embodiment, any suitable scrubbing technique may be used. Subsequently, a clean syngas 58 is routed from scrubber 56 to an expander 60 to facilitate energy recovery through the expansion of syngas stream 54. Syngas stream 54 may be further cooled, purified, and/or cleaned (not shown) and directed into a power system or power island 62 for use in the generation of power, and/or for the production of chemicals. For example, power island 62 may include a gas turbine 64 suitable for using syngas stream 54 as fuel and converting the fuel to rotational energy, which can be converted by a generator 65 into electrical power.

In the exemplary embodiment, power generation system 10 includes a steam turbine engine 66 and a heat recovery steam generation (HRSG) system 68. Steam turbine engine 66 may drive a load 70, which may be an electrical generator for generating electrical power. Heated exhaust gas 72 from gas turbine engine 64 is transported into HRSG 68 and used to heat water and produce steam used to power steam turbine engine 66 for power generation. In addition, high-pressure, high-temperature steam produced by HRSG 68 may also be supplied to other processes where steam may be used, such as via line 74 to gasifier 34, drying unit 18 and/or gasifier 22, as described in more detail herein. Alternatively or in addition, a heat transfer line 76 may be thermally coupled to gasifier 34 and/or to cooler 52 to supply a heat transfer fluid (e.g., water) to drying unit 18 and/or gasifier 22 to provide at least a portion of the heating requirements thereof.

Figure 2:
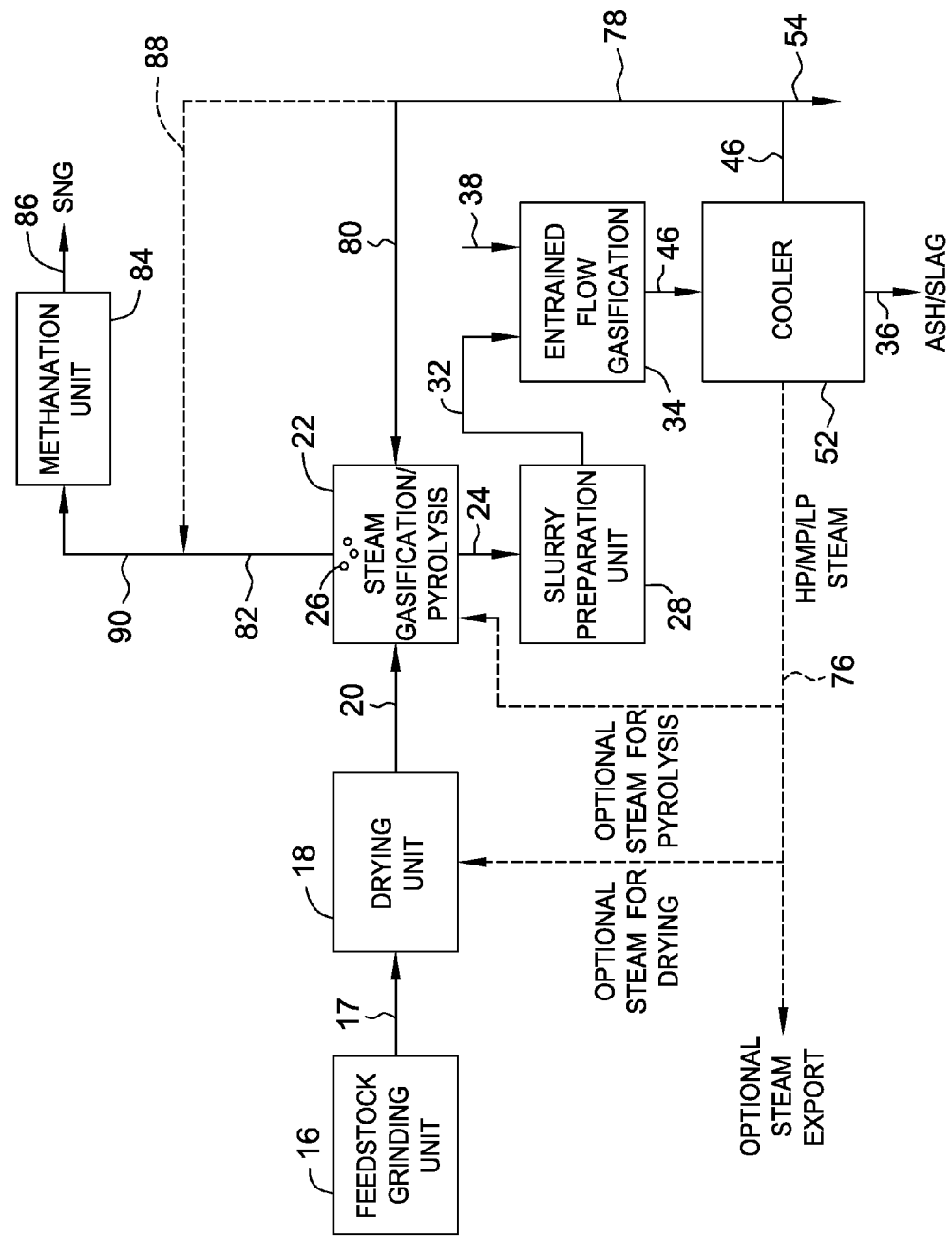
FIG. 2 is a detailed schematic view of the system shown in FIG. 1.

FIG. 2 illustrates a detailed schematic illustration of a portion of system 10 that is used to produce synthetic natural gas (SNG). As described herein, system 10 includes drying unit 18, steam gasifier 22, slurry preparation unit 28, entrained flow gasifier 34, and cooler 52. In the exemplary embodiment, cooler 52 is a combination quench and radiant synthesis gas cooler (RSC). However, cooler 52 may be any type of cooler that enables system 10 to function as described herein. Entrained flow gasifier 34 produces syngas a stream 46 containing CO and H2 that is cooled in cooler 52 and that is split into first portion of syngas 54 and a second portion of syngas 78. A portion of hot syngas stream 78 is recycled to steam gasifier 22 as a recycled syngas stream 80 to provide at least a portion of the heating requirements for the pyrolysis process that takes place in gasifier 22. Recycled syngas 80 mixes with hydrocarbons 26 produced by the pyrolysis process and is then conveyed from gasifier 22 as a hydrocarbon-rich syngas stream 82 mostly containing methane. Although not shown, some components of stream 82 may be separated from the methane and recycled back to gasifier 34. In the exemplary embodiment, hydrocarbon-rich syngas stream 82 is conveyed to a methanation unit 84 where it undergoes a methanation process to produce SNG 86. In addition, another portion of syngas stream 78 may bypass steam gasifier 22 as a syngas bypass stream 88 to enable the concentration of hydrocarbon-rich syngas stream 82 to be adjusted for the methanation process.

In operation, grinding unit 16 receives a low-rank feedstock 14 (e.g., low rank coal) from fuel source 12 to supply drying unit 18. Feedstock 14 is heated and dried in drying unit 18 to produce dried feedstock 20 that is supplied to steam gasifier 22. Dried feedstock 20 undergoes a pyrolysis process in gasifier 22, which is heated by heat energy sources. In the exemplary embodiment, hot syngas recycle stream 80 provides the primary heat energy source for the pyrolysis process, and steam line 74, heat transfer line 76, and/or any other suitable heat source provides a supplemental heat energy source to gasifier 22 for the pyrolysis process. During pyrolysis, moisture, volatiles, and hydrocarbons are substantially removed from feedstock 20 to produce fixed carbon 24. The pyrolysis process essentially upgrades feedstock 20 from a low rank fuel to fixed carbon 24. Fixed carbon 24 is then supplied to slurry preparation unit 28 wherein it is mixed with water 30 or any other suitable liquid to form a suitable slurry feedstock 32. Alternatively, fixed carbon 24 is supplied as a dry feed. Slurry feedstock 32 is conveyed to entrained flow gasifier 34 where feedstock 32 is mixed with air 42 discharged from ASU 40 and undergoes a high temperature, high pressure gasification process to produce syngas 46 and slag 36.

In the exemplary embodiment, slag 36 is channeled to coarse slag handling unit 48 to produce coarse slag 50, and syngas stream 46 is routed to cooler 52 wherein heat is transferred using a heat transfer fluid (e.g., steam) circulating within HRSG 68 and/or within heat transfer line 76. Heat energy removed from syngas stream 46 may then be transferred via line 74 and/or line 76 to another portion of system 10. In the exemplary embodiment, at least a portion of the heating requirement of drying unit 18 and gasifier 22 is supplied by HRSG line 74 and/or heat transfer line 76.

In the exemplary embodiment, syngas stream 46 is removed from cooler 52 and split into first syngas stream 54 and second syngas stream 78. Syngas stream 54 is conveyed to scrubber 56 wherein stream 54 is scrubbed, and the resulting clean syngas 58 is sent to expander 60 and/or to further cleaning/cooling. Syngas 58 is directed to power island 62 to produce electrical power via gas turbine 64. A resulting turbine exhaust 72 may be directed toward HRSG 68 to facilitate heating steam that is then directed to steam turbine 66 to produce additional electrical power via load 70 (e.g., a generator). System 10 includes a controller (not shown) that facilitates control of the relative proportion of syngas flow through first stream 54 and second stream 78 depending on desired system operations and demands. Alternatively, syngas 46 may be exclusively channeled to first stream 54 or second stream 78.

In the exemplary embodiment, second syngas stream 78 is conveyed to gasifier 22 as recycled syngas stream 80 to facilitate heating gasifier 22. As such, recycle stream 80 heats dried feedstock 20, reacts, and/or mixes with hydrocarbons (predominantly methane) separated from feedstock 20, and is removed from gasifier 22 as a hydrocarbon-rich syngas stream 82. In the exemplary embodiment, hydrocarbon-rich syngas stream 82 is conveyed to methanation unit 84 where it undergoes a methanation process to convert H2 and CO entrained in the syngas into SNG stream 86 that primarily contains methane. Second syngas stream 78 may optionally bypass gasifier 22 as bypass syngas stream 88 and mix with hydrocarbon-rich syngas stream 82 to form a product stream 90 before entering methanation unit 84. A controller (not shown) may control the proportional flows between recycle stream 80 and bypass stream 88 to provide product stream 90 with H2 and CO ratios suitable for the methanation process in methanation unit 84. In one embodiment, tars and/or other components of stream 80 are recycled back to gasifier 34 via slurry preparation unit 28.

In the exemplary embodiment, the production system for generation of SNG 86 may include a composite water-gas shift (WGS)-methanation reactor that incorporates both a WGS reactor and a methanation reactor into a single unit. Alternatively, the WGS reactor and methanation reactor may be separate units. Methanation unit 84 may operate with either a sweet or a sour configuration, where sulfur has been removed from the syngas prior to it being converted into an SNG rich gas, or where sulfur is present in the syngas as it is converted into an SNG rich gas. In this manner, methanation unit 84 may operate utilizing raw syngas (syngas containing sulfur) or clean syngas (syngas without sulfur). Additionally, an acid gas removal system may be utilized with methanation unit 84. Although not shown, the resulting SNG stream 86 may be fed into the combustor of a gas turbine of a natural gas combined cycle (NGCC) power plant and ignited to power the gas turbine for use in the generation of electricity or for general sale as SNG product.

As described herein, systems and methods are provided for producing SNG and syngas from low rank feedstock. A low rank feedstock is dried and subjected to a pyrolysis process in a low pressure, low temperature steam gasifier to liberate hydrocarbons and yield fixed carbon suitable for use in an entrained flow gasifier. At least a portion of the hot syngas produced from the entrained flow gasifier is used as a heat source for the pyrolysis process and reacts with the hydrocarbons to form a hydrocarbon-rich syngas stream that may then undergo a methanation process to convert a portion of the syngas to methane. Additional heating may be provided to a drying unit and to the steam gasifier by a heat transfer fluid from a cooler that cools the syngas product of the entrained flow gasifier. As such, the systems and methods described herein enable gasification systems to utilize lower cost, low rank fuels to produce SNG and/or electrical power.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gasification system for supplying syngas in an integrated gasification combined-cycle (IGCC) power plant that uses steam from a heat recovery steam generator (HRSG) heated via exhaust from a gas turbine engine, said system comprising:
   a first gasifier for receiving a feed of low rank fuel and gasifying the low rank fuel to produce hydrocarbons and fixed carbon;
   a second gasifier for producing a syngas stream using fixed carbon received from said first gasifier;
   a cooler for receiving the syngas stream from said second gasifier and cooling the received syngas stream;
   a first conduit selectively coupled between said cooler and said first gasifier for recycling at least a portion of the received syngas stream to said first gasifier to facilitate heating low rank fuel within said first gasifier such that the recycled syngas mixes with the hydrocarbons in said first gasifier to produce a hydrocarbon-rich syngas stream; and
   a second conduit selectively coupled between the HRSG and said first gasifier for channeling steam from the HRSG to said first gasifier to facilitate heating the low rank fuel in said first gasifier.

2. The system of claim 1, further comprising a drying unit coupled in flow communication with said first gasifier for drying the low rank fuel before said first gasifier receives the low rank fuel.

3. The system of claim 1, wherein said cooler is at least one of a quench and a radiant syngas cooler.

4. The system of claim 1, further comprising a bypass conduit selectively coupled to said first conduit for channeling at least a portion of the recycled syngas around said first gasifier.

5. The system of claim 1, further comprising a slurry preparation unit selectively coupled in flow communication between said first gasifier and said second gasifier for receiving the fixed carbon and producing a slurry feed for said second gasifier.

6. The system of claim 1, further comprising a methanation unit selectively coupled to said first gasifier for receiving the hydrocarbon-rich syngas stream from said first gasifier to facilitate producing a synthetic natural gas stream therefrom.

7. An integrated gasification combined-cycle (IGCC) power plant comprising:
   at least one gas turbine engine that produces exhaust;
   a heat recovery steam generator (HRSG) coupled in flow communication with said at least one gas turbine engine to receive exhaust from said at least one gas turbine engine for heating said HRSG to produce steam;

a steam turbine coupled in flow communication with said HRSG for receiving steam from said HRSG; and at least one gasification system for supplying syngas to said at least one gas turbine engine, said at least one gasification system comprising:

a first gasifier for receiving a low rank fuel and gasifying the low rank fuel to produce hydrocarbons and fixed carbon;

a second gasifier for producing a syngas stream using fixed carbon received from said first gasifier;

a cooler for receiving the syngas stream from said second gasifier and cooling the received syngas stream;

a first conduit coupled between said cooler and said first gasifier for recycling at least a portion of the received syngas stream to said first gasifier to facilitate heating low rank fuel within said first gasifier such that the recycled syngas mixes with the hydrocarbons in said first gasifier to produce a hydrocarbon-rich syngas stream; and a second conduit coupled between said HRSG and said first gasifier for channeling steam from said HRSG to said first gasifier to facilitate heating the low rank fuel in said first gasifier.

8. The plant of claim 7, further comprising a drying unit coupled in flow communication with said first gasifier for drying the low rank fuel before said first gasifier receives the low rank fuel.

9. The plant of claim 7, wherein said cooler is at least one of a quench and a radiant syngas cooler.

10. The plant of claim 7, further comprising a bypass conduit coupled to said first conduit for channeling at least a portion of the recycled syngas around said first gasifier.

11. The plant of claim 7, further comprising a slurry preparation unit coupled in flow communication between said first gasifier and said second gasifier for receiving the fixed carbon and producing a slurry feed for said second gasifier.

12. The plant of claim 7, further comprising a methanation unit coupled to said first gasifier for receiving the hydrocarbon-rich syngas stream from said first gasifier to facilitate producing a synthetic natural gas stream therefrom.

13. A method of assembling an integrated gasification combined-cycle (IGCC) power plant, said method comprising:

coupling a heat recovery steam generator (HRSG) in flow communication with at least one gas turbine engine to receive exhaust from the at least one gas turbine engine for heating the HRSG to produce steam;

coupling a steam turbine in flow communication with the HRSG for receiving steam from the HRSG;

providing a first gasifier for receiving a low rank fuel and gasifying the low rank fuel to produce hydrocarbons and fixed carbon;

coupling a second gasifier in flow communication with the first gasifier for producing a syngas stream using fixed carbon received from the first gasifier;

coupling a cooler in flow communication with the second gasifier for receiving the syngas stream from the second gasifier and cooling the received syngas stream;

coupling the cooler in flow communication with the first gasifier via a first conduit for recycling at least a portion of the received syngas stream to the first gasifier to facilitate heating low rank fuel within the first gasifier such that the recycled syngas mixes with the hydrocarbons in the first gasifier to produce a hydrocarbon-rich syngas stream; and coupling the HRSG in flow communication with the first gasifier via a second conduit for channeling steam from the HRSG to the first gasifier to facilitate heating the low rank fuel in the first gasifier.

14. The method of claim 13, further comprising coupling a drying unit in flow communication with the first gasifier for drying the low rank fuel before the first gasifier receives the low rank fuel.

15. The method of claim 13, further comprising providing the cooler as at least one of a quench and a radiant syngas cooler.

16. The method of claim 13, further comprising coupling a bypass conduit to the first conduit for channeling at least a portion of the recycled syngas around the first gasifier.

17. The method of claim 13, further comprising coupling a slurry preparation unit in flow communication between the first gasifier and the second gasifier for receiving the fixed carbon and producing a slurry feed for the second gasifier.

18. The method of claim 13, further comprising coupling a methanation unit to the first gasifier for receiving the hydrocarbon-rich syngas stream from the first gasifier to facilitate producing a synthetic natural gas stream therefrom.

* * * * *